United States Patent
Refregier et al.

[11] Patent Number: 5,430,454
[45] Date of Patent: Jul. 4, 1995

[54] DEVICE FOR CREATING OPTICAL DELAYS AND APPLICATION TO AN OPTICAL CONTROL SYSTEM FOR A SCANNING ANTENNA

[75] Inventors: Philippe Refregier, Palaiseau; Daniel Dolfi, Orsay; Jean-Pierre Huignard, Paris, all of France

[73] Assignee: Thomson-CSF, Puteaux, France

[21] Appl. No.: 777,214

[22] PCT Filed: Mar. 12, 1991

[86] PCT No.: PCT/FR91/00199
§ 371 Date: Nov. 6, 1991
§ 102(e) Date: Nov. 6, 1991

[87] PCT Pub. No.: WO91/14196
PCT Pub. Date: Sep. 19, 1991

[30] Foreign Application Priority Data
Mar. 16, 1990 [FR] France .................. 90 03386

[51] Int. Cl.$^6$ ............................................. H01Q 3/22
[52] U.S. Cl. ...................................... 342/375; 342/368
[58] Field of Search ............. 342/158, 157, 368, 371, 342/372, 375

[56] References Cited

U.S. PATENT DOCUMENTS
4,725,844  2/1988  Goodwin et al. .................. 342/374

FOREIGN PATENT DOCUMENTS
0287444  10/1988  European Pat. Off. .
0331462   9/1989  European Pat. Off. .

OTHER PUBLICATIONS
Society of Photo-optical Instrumentation Engineers SPIE, vol. 176, 1979, pp. 17–27; Taylor: "Fiber and integrated optical devices for signal processing".
Patent Abstracts of Japan, vol. 012, No. 276 (P-737) 30 Jul. 1988, & JP-A-63 055519 (Natl Space Dev Agency Japan (NASDA)).

Primary Examiner—John B. Sotomayor
Attorney, Agent, or Firm—Oblon, Spivak, McClelland, Maier & Neustadt

[57] ABSTRACT

Device for creating optical delays in which several secondary optical paths are provided and placed in series and in shunt with a main optical path. Access to the secondary optical paths is obtained via switches that are placed along the main optical path. The length of the delay circuits are in a geometric progression whose common ratio has the value of two. Depending upon the switching states of the switches it is therefore possible to obtain a series of equal distant delays with a relatively small number of switches.

31 Claims, 9 Drawing Sheets

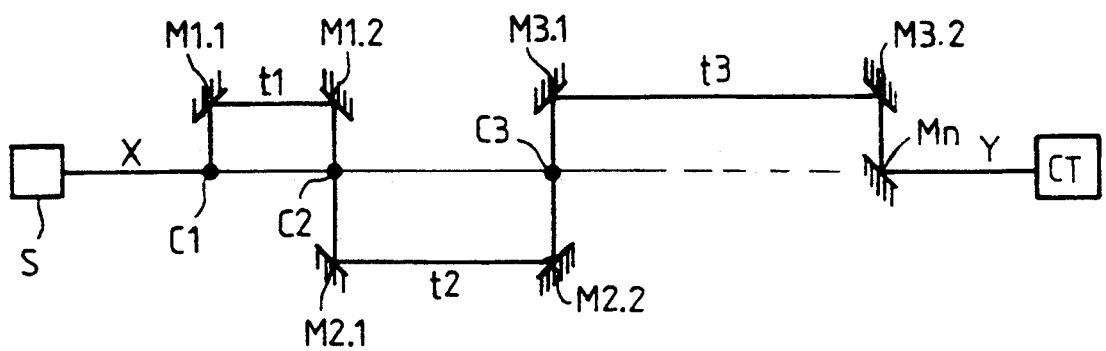
FIG_1
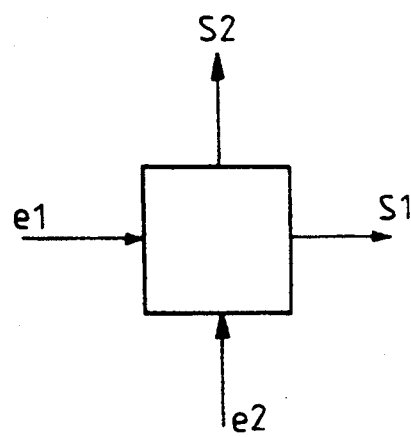
FIG_2
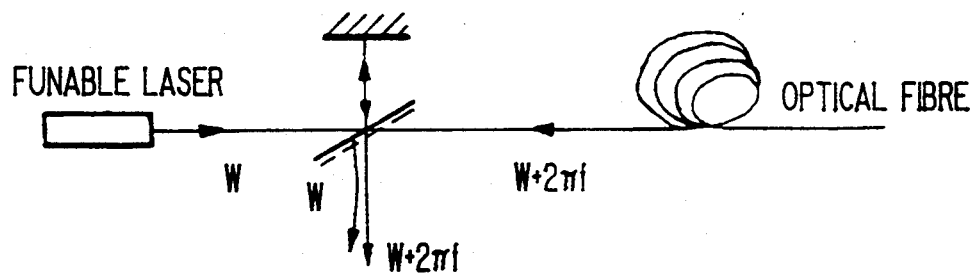
FIG_15

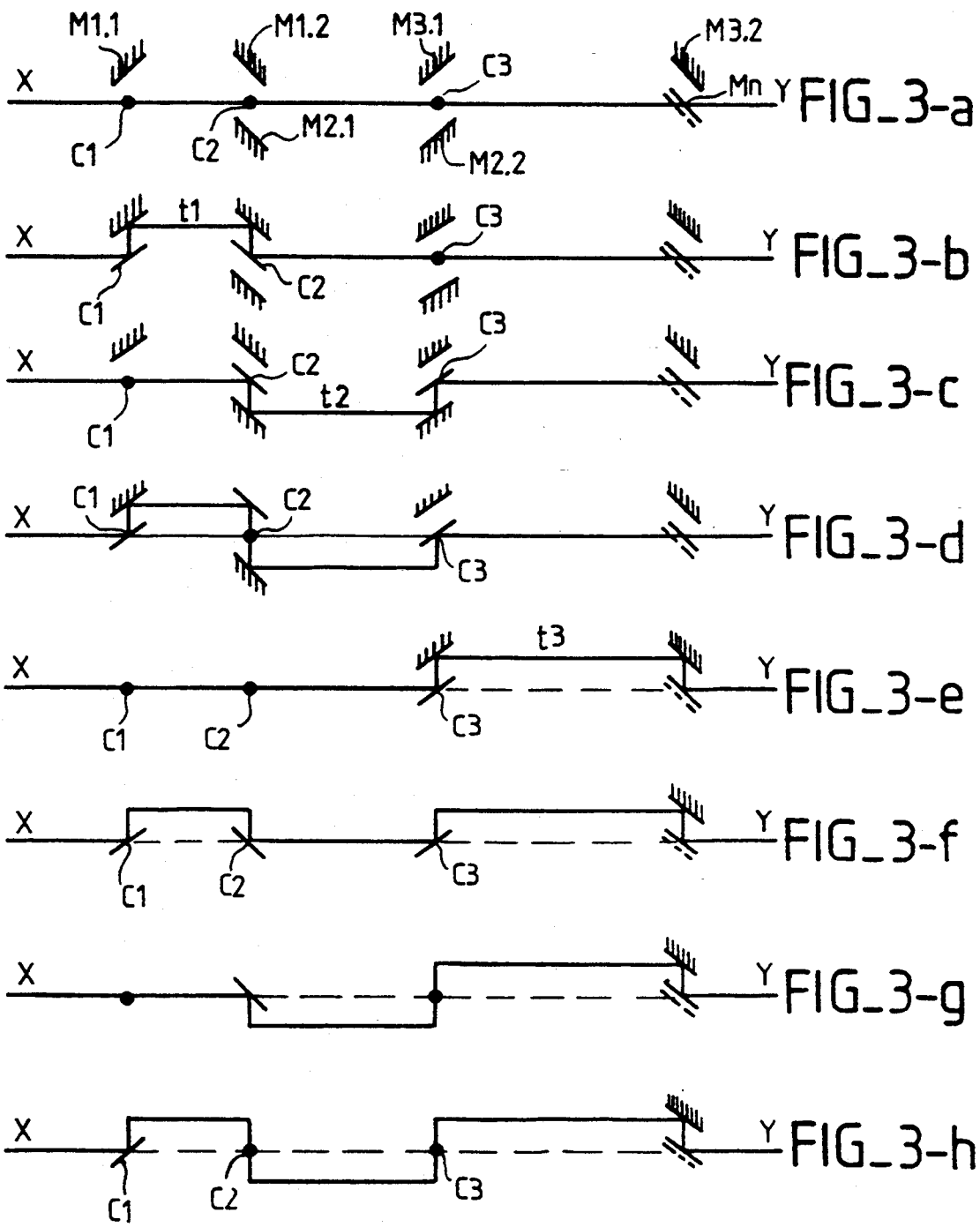

FIG_4
|      | C1 | C2 | C3 |
|------|----|----|----|
| 0    | 0  | 0  | 0  |
| 1×t  | 1  | 1  | 1  |
| 2×t  | 0  | 1  | 1  |
| 3×t  | 1  | 0  | 1  |
| 4×t  | 0  | 0  | 1  |
| 5×t  | 1  | 1  | 1  |
| 6×t  | 0  | 1  | 0  |
| 7×t  | 1  | 0  | 0  |
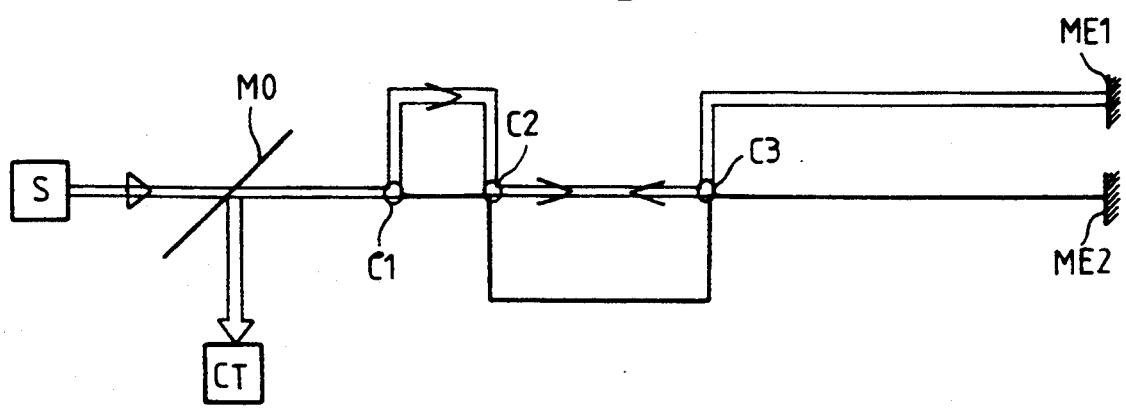
FIG_5

FIG_6
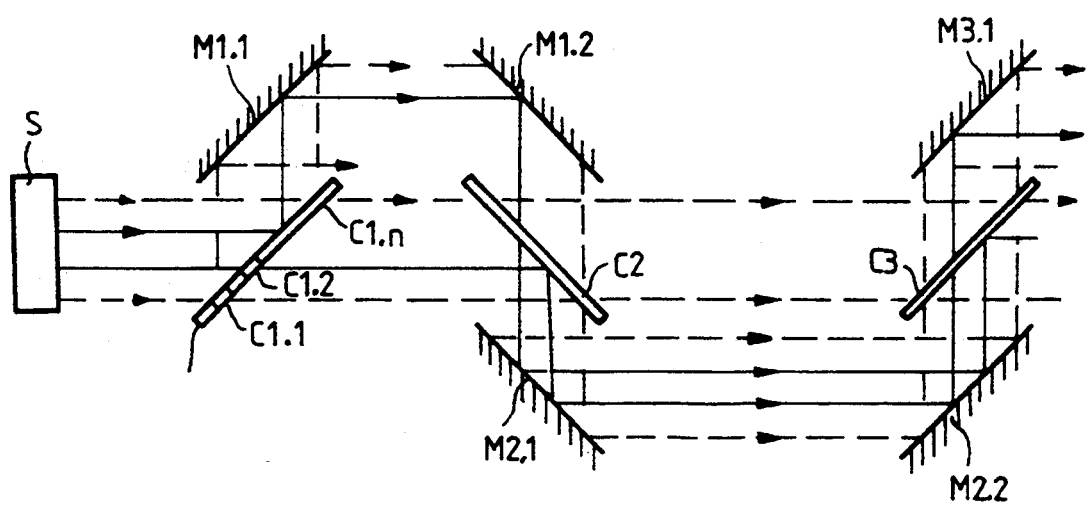
FIG_7
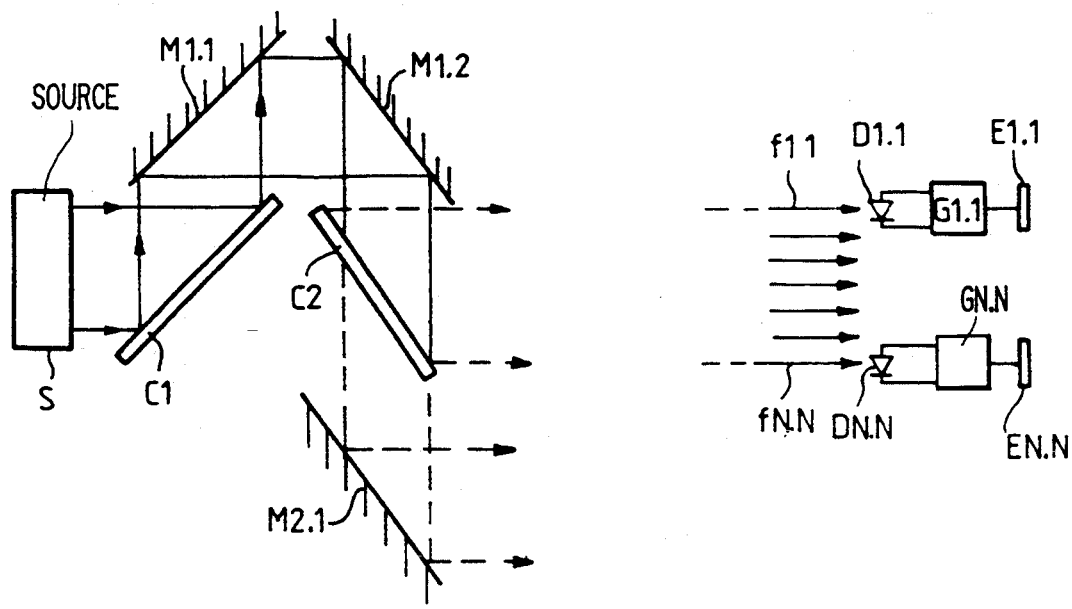

FIG_8
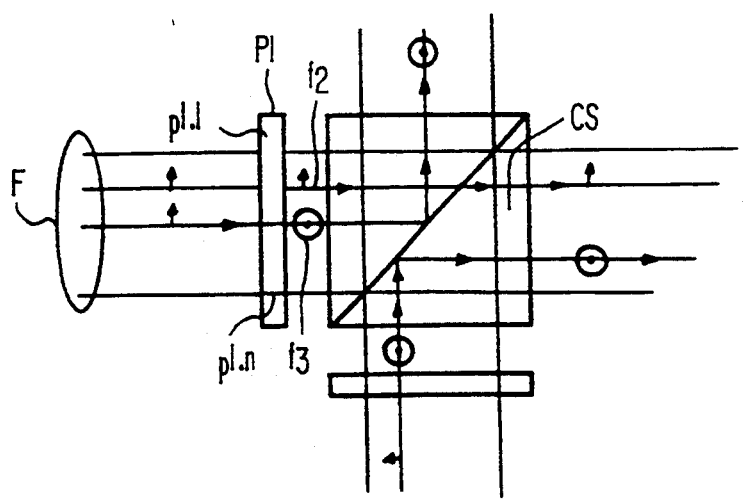
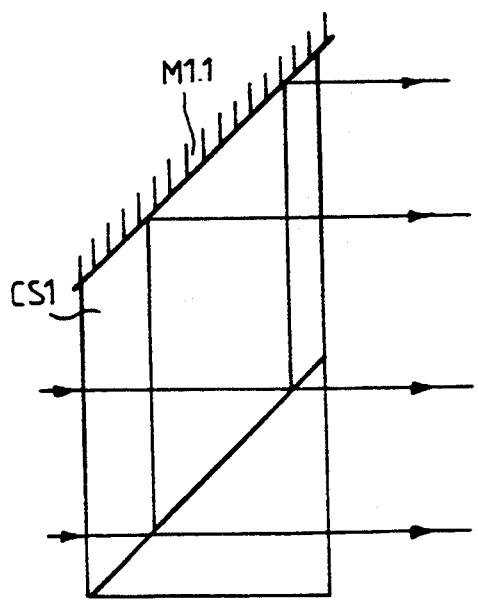
FIG_9-a
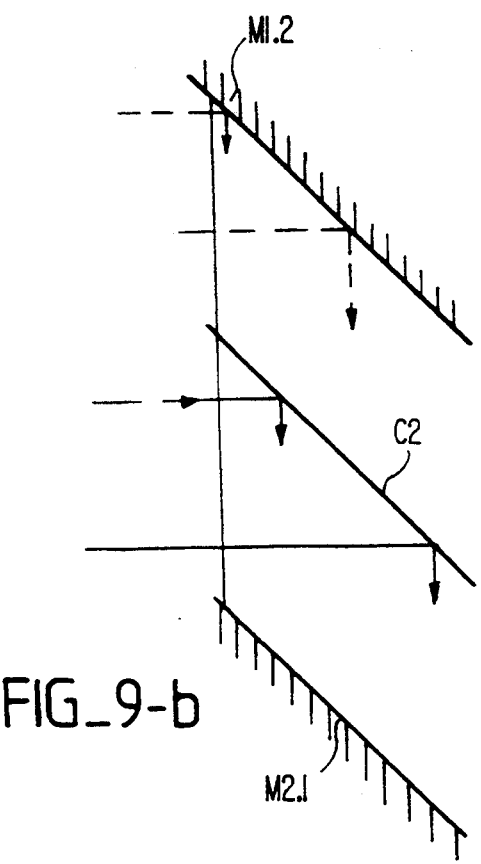
FIG_9-b

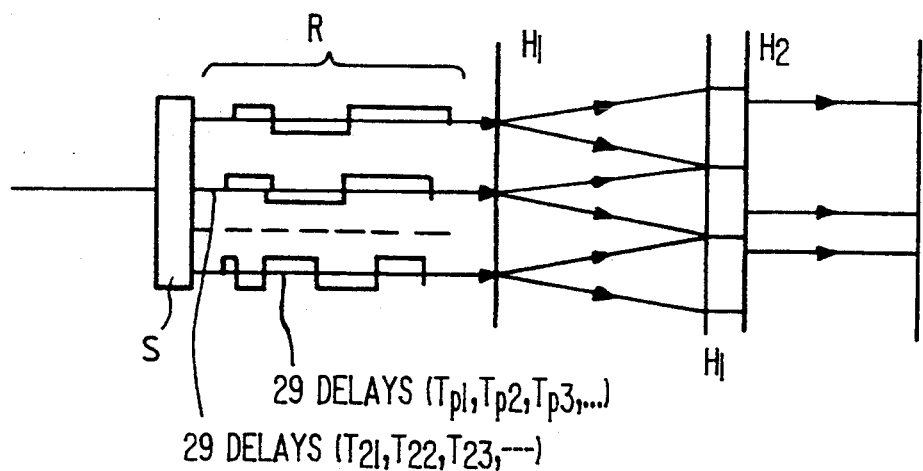
FIG_10
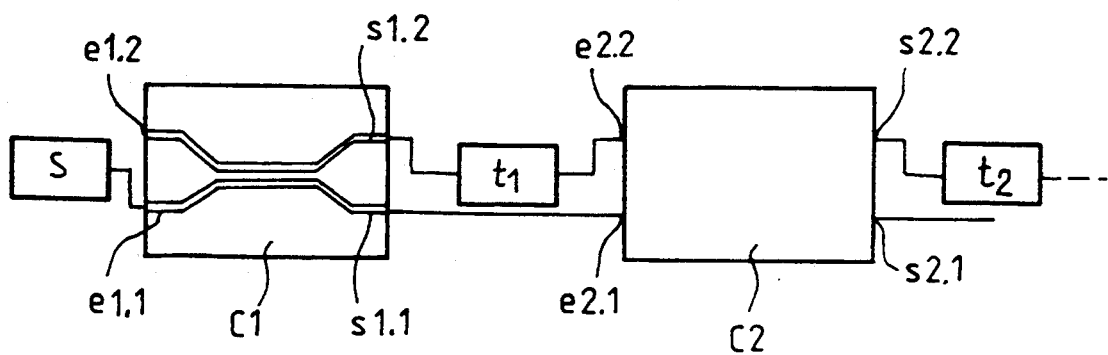
FIG_11

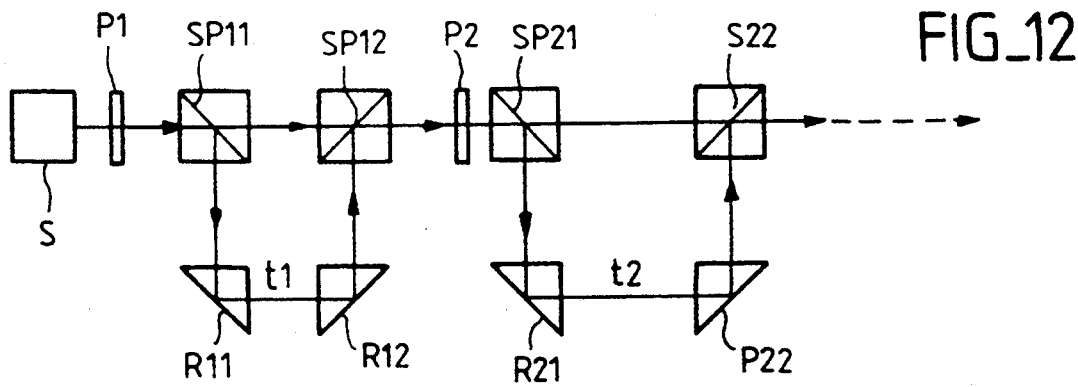
FIG_12
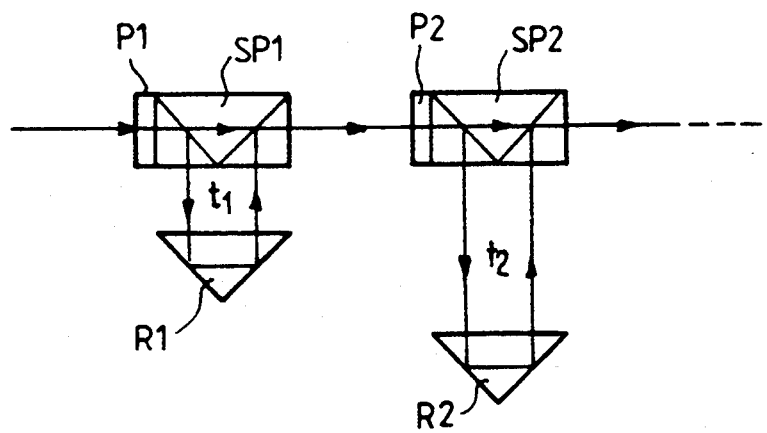
FIG_13
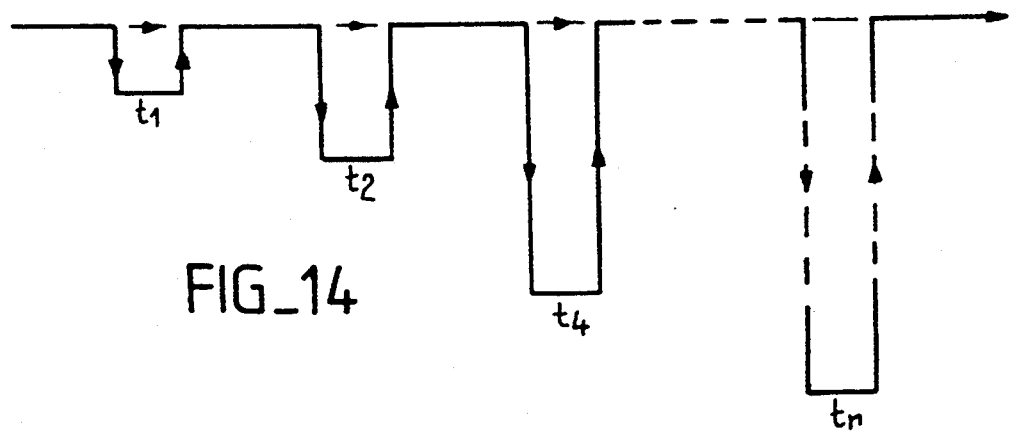
FIG_14

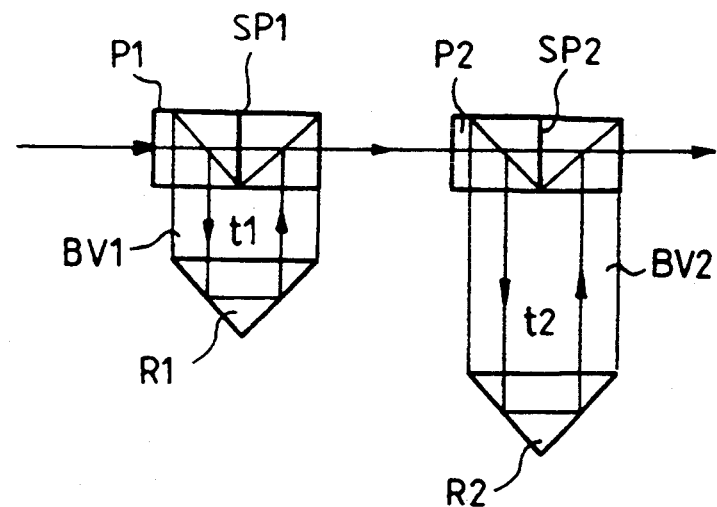
FIG_16
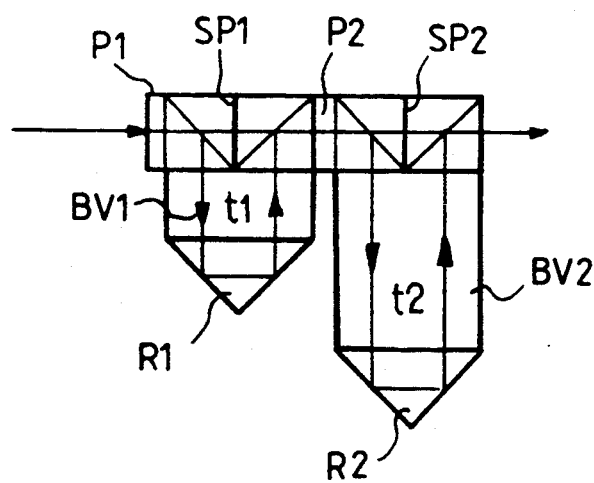
FIG_17

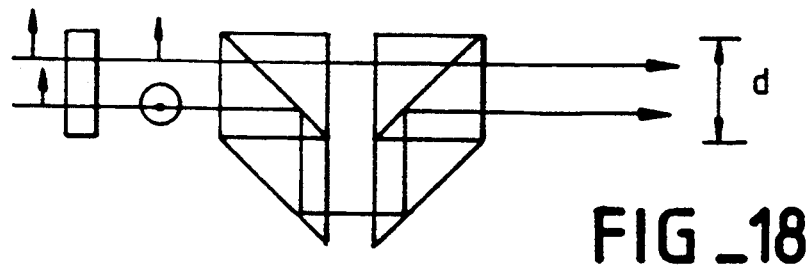
FIG_18
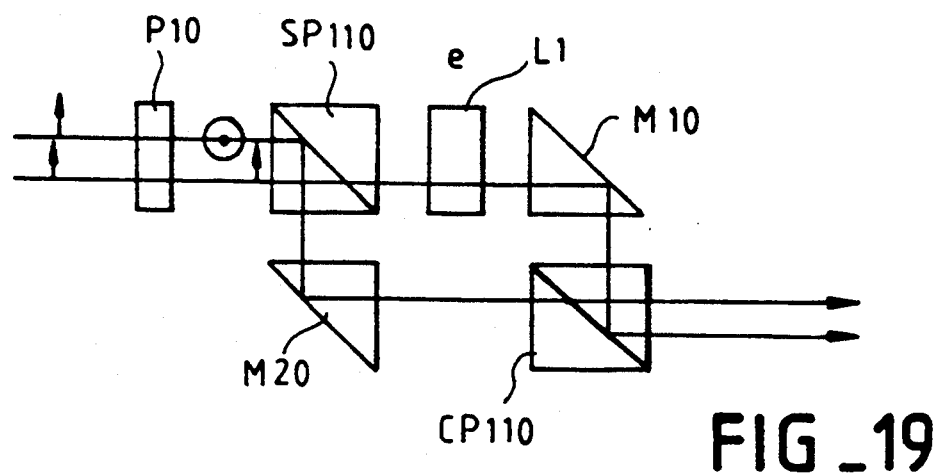
FIG_19
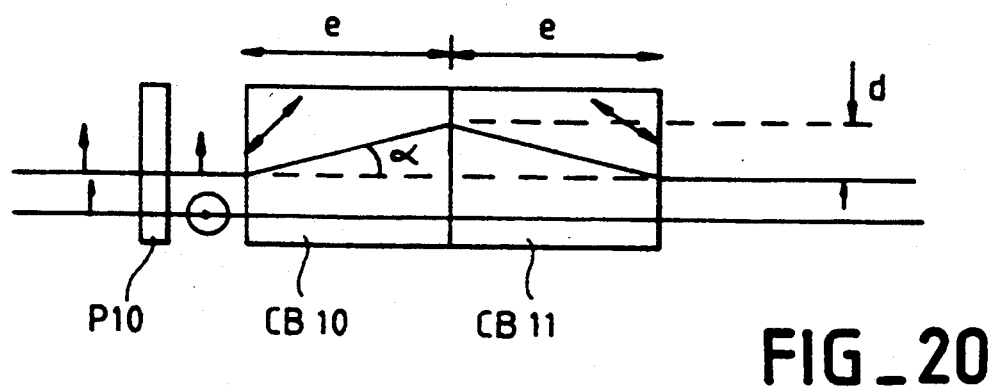
FIG_20

DEVICE FOR CREATING OPTICAL DELAYS AND APPLICATION TO AN OPTICAL CONTROL SYSTEM FOR A SCANNING ANTENNA

BACKGROUND OF THE INVENTION

1. Field of the Invention

The invention relates to a device for creating optical delays and its application to an optical control system for a scanning antenna. More particularly this application relates to a system for generating physical delays for the optical control of scanning antennas. It is a matter of simplifying the structure of the system generating the optical delays and of limiting the number of active elements allowing these delays to be selected.

2. Discussion of the Background

Systems are known which allow the control, by optical means, of the radiation pattern of an antenna. They allow control of the phase of the microwave frequency signal transmitted by each antenna element and whose frequency is included in the frequency band 1–12 GHz. The proposed device in particular provides the angular scanning function of the beam on the basis of the control of the phase of each element of the antenna.

The present scanning techniques are electronic and act on the respective phases of the controls of the various radiating elements. The phase-shifting elements are ferrite or PIN diode devices. These structures, apart from their weight and consumption, have the disadvantage of only allowing a narrow band functioning of the antenna. In fact, the phase shifters only act between 0 and $2\pi$ and therefore, during a change in frequency in the transmitted signal, there is off-aiming of the antenna.

It is known, particularly from the French Patent Application N° 87 05267 filed on the 14th Apr. 1987, to produce microwave frequency delay lines with programmable lengths and of small size by optical means. This consists in generating a microwave frequency signal by the beating of two collinear light waves, in making these two light waves travel a path whose length is adjustable by controlled reflectivity electro-optical modulators and in detecting the microwave frequency beat of the two collinear light waves at the end of the path by means of a photodetector.

According to the prior art, it is therefore a matter of encoding the microwave frequency signal, necessary for the control of the active elements of the antenna, on an optical carrier and to physically produce the delays which will allow the phase shifting of this microwave frequency in order to perform the electronic scanning appropriate to this type of radar. In order to produce P phase shifts, it is necessary to generate P optical paths having different lengths and to choose these delays either a priori or a posteriori.

The main problem encountered with the solutions proposed previously is the necessity of disposing in the system a number of optical switches (or light modulators) which is equal to the number of delays desired that is, each optical switch. In the case in which the delays are chosen a priori, this results in a high complexity of the system, in a high cost and a possible large attenuation of the optical wave (due to the different modulators). The same problems are also encountered when the choice of the delays is made a posteriori and is even more critical with regard to the attenuation of the optical wave.

The purpose of the invention is to provide an encoding system limiting the complexity of the system (but having an equivalent number of available delays as provided by prior systems,) while allowing a reduction in the attenuation of the optical wave and achieving these purposes at a lower cost.

SUMMARY OF THE INVENTION

The proposed antenna control device allows the generation of delays and the wide band functioning of the antenna. The latter is therefore supplied with delays by means of the optical control, the microwave frequency phase-shifters providing a fine adjustment of the phase between 0 and $2\pi$.

The invention therefore relates to a device for creating optical delays characterised in that it comprises several switches arranged in a determined order and comprising at least a first input and a second input and at least a first output and a second output allowing the coupling of an input to one or other of the outputs; this device being arranged as follows:

the first input of a first switch is connected to a source emitting a light beam to be processed;

the first output of each switch is connected to the first input of the following switch or, for the last switch, this first output is connected to a user circuit;

the second output of each switch is connected to the second input of the following switch by the intermediary of an optical delay circuit.

The invention also relates to a device for the optical control of a scanning antenna comprising:

an array of a determined number of antenna elements, the various elements being arranged according to a determined order and each controlled by a microwave frequency amplifier a light source simultaneously emitting at least two collinear beams having different frequencies, characterised in that it also comprises:

$N^2$ delay devices comprising a number of switchable optical paths receiving the two collinear beams and each providing an optical propagation time which is characteristic of it, $N^2$ photodetector devices each coupled to a microwave frequency generator in order to control an antenna element.

The various purposes and characteristics of the invention will appear in the following description and in the appended figures in which:

FIG. 1 shows a basic version of the optical control system according to the invention, FIG. 2 shows an example of the functioning of a switch such as those used in the system of FIG. 1, FIGS. 3a to 3h shows examples of functioning of the system of FIG. 1, FIG. 4 is a table showing the functioning of the system of FIG. 1, FIG. 5 shows a variant embodiment of the system of the invention operating by reflection, FIG. 6 shows a detailed example of embodiment of the system of the invention, FIG. 7 shows an example of embodiment of an application of the system of the invention to the control of a scanning antenna, FIG. 8 shows an example of embodiment of a switch according to the invention by means of polarisation separator cubes, FIGS. 9a and 9b show particular forms of embodiment of switches according to the embodiment shown in FIG. 8, FIG. 10 shows a variant embodiment of the device of the invention, FIG. 11 shows an example of embodiment of the system of the invention comprising integrated optical switches, FIGS. 12 to 14 show a variant embodiment of the system of the invention, FIG. 15 shows a system for the superimposition of laser beams using the Brouillin effect, FIGS. 16 and 17 show variant embodiments of the systems of FIGS. 12 to 14;

FIG. 18 is a figure explaining the system of the invention;

FIGS. 19 and 20 show other variant embodiments of the system of the invention.

In general, it is appropriate to state, without referring to the figures, that the purpose of the device of the invention is to encode the delays of a light signal in the form of a series of p basic delays which will allow the generation, in their turn, of $2^p$ delays, corresponding to the desired phase shifts of the microwave frequency signal in order to allow the optical control of scanning antennas. In fact, the optical embodiment of this encoding method for the generation of delays is carried out in an advantageous manner when use is made of the general property of optical switches of having four ports.

The basic principle of the encoding of delays according to the invention is illustrated in FIG. 1. This encoding system shows that, with the help of p different delays and p active switches, it is possible to generate $2^p$ delays.

FIG. 1 shows a main optical path XY connecting a light source S with at least one user circuit CT. Optical switches C1, C2, C3, C4 . . . have been disposed at different points in this optical path. Each switch has, as shown in FIG. 2, two inputs C1 and C2 and two outputs S1, and S2. In the passing state (the OFF state) the light entering the switch through one input is not deflected and emerges on the opposite output:

input e1 is coupled to output s1
input e2 is coupled to output s2.

In the switched state (the ON state) the light entering the switch through one input is deflected (reflected) towards the output which is closest to it. Thus, input e1 is coupled to output s2
input e2 is coupled to output s1.

In the device of FIG. 1, when all the switches are in the passing state, the light follows the main optical path XY.

The function of each switch is to route the light which it receives towards a basic delay path which transmits the light to the adjacent switch. Between two consecutive switches there is therefore disposed a basic delay path in addition to a portion of the main optical path. The various basic delay paths t1, t2, t3, t4 are produced in different lengths.

According to the embodiment shown in FIG. 1, each basic delay path couples two adjacent switches by means of mirrors such as M1.1, M1.2 but other means, such as optical fibres, could be envisaged.

FIGS. 3a to 3h show the various states of switching of the system in FIG. 1.

In these figures a switch C1 to C3 in the passing state (OFF state) is represented by a point. A switch in the switched state (ON state) is represented by a thick line inclined in such a way as to indicate the direction of reflection of the light by the switch.

In FIG. 3a all the switches are in the passing state. A light beam coming from the point X travels through the main optical path and is not delayed.

In FIG. 3b, the switches C1 and C2 are switched. The switch C1 reflects the light towards the basic delay path t1 and the switch C2 reflects the light towards the main optical path.

In FIG. 3c, the switch C2 reflects the light towards the basic delay path t2 and the switch C3 reflects the light towards the main optical path.

In FIG. 3d, the switch C3 reflects the light towards the basic delay path t3. The mirrors M3.2 and Mn reflect the light towards the main optical path.

FIGS. 3e to 3g show other possible combinations of switching states.

As can be seen in these figures, the mirror Mn is a semi-transparent mirror. The switching devices are inclined with respect to the direction of the main optical path in order to be able, when it is in the switched state, either to reflect the light towards a basic delay path or to reflect the light coming from a basic delay path towards the main optical path XY.

The switches C1 to C3 and the mirror Mn are therefore inclined, as can be seen in FIG. 3h, in an alternating manner by $+45°$ and $-45°$ with respect to the direction XY.

A particularly advantageous embodiment is that in which the desired delays are equidistant. For this purpose, it suffices that the basic delays increase according to a geometric progression with a common ratio of 2.

In FIG. 1, the basic delays will therefore have the following values:

$t1 = t$
$t2 = 2t$
$t3 = 4t$

The principle of the proposed encoding system is explained as follows. It will be considered (in order to simplify the explanation) that all of the delays are expressed with respect to that of the shortest path which, for example, corresponds to the case in which all the switches are passing (FIG. 3a).

If the switches C1 and C2 are switched, and C3 is passing then there will be generation of a delay $r = t_1$ (FIG. 3b)

If the switches C2 and C3 are switched and C1 is passing then there will be generation of a delay $r = t_2$ (FIG. 3c).

If the switches C1 and C3 are switched and C2 is passing then there will be a generation of delay $r = t_1 + t_2$ (FIG. 3d).

Etc . . .

The operating table shown in FIG. 4 contains all the operating cases of FIGS. 3a to 3h. It can be seen in this table that with a geometric progression of basic delays with a common ratio 2, equidistant delay values are obtained:

0, t, 2t, 3t . . . 7t.

The system of FIG. 1 functions by transmission. The system of FIG. 5 shows a similar system functioning by reflection. The beam emitted by the source S is transmitted to the system by a semi-reflecting mirror MO. After passing through the switches C1, C2, C3, it is reflected by end mirrors ME1, ME2 and returns through the same path in order to be reflected by the semi-reflecting mirror MO towards the user circuits CT.

This type of embodiment is possible because of the reverse return of the light in the switches and allows a more compact embodiment.

The previously described general principle is simply applied if it is considered that at each switching node there is placed a matrix of switches as shown in FIG. 6.

According to the system of FIG. 6, each switch C1 to C3 is constituted by a group of switches disposed in a same plane. For example, according to a preferred embodiment, a liquid crystal cell will be used to produce a plane of switches, each image element of the liquid crystal cell constituting a switch.

The first cell C1 is uniformly illuminated by the beam to be processed. The various cells C1 to C3 are identical and aligned along the direction of the beam to be processed. Each image element of the first cell C1 determines a portion of the light beam to be processed.

After processing by the system of FIG. 6, the output beam is therefore constituted by as many elementary beams as there are image elements in the cells C1 to C3. Each elementary beam is given a delay corresponding to the path through which it has travelled, that is to say, according to the previously described example (3 basic delays), by a delay chosen from the table given in FIG. 4.

FIG. 7 shows an application of the previous system to a system for controlling a scanning antenna.

The source S emits two superimposed optical beams having different wavelengths for the purpose of obtaining a microwave frequency signal. A microwave frequency signal can be obtained either by modulating the amplitude of the optical carrier (direct modulation of the laser source or external modulation) or by superimposition of two laser beams of different frequencies.

The superimposition of two laser beams of different frequencies can be carried out in different ways:

a)—frequency translation in a Bragg optoacoustic cell followed by recombination of the two beams obtained as it is known in the art.

b)—in order to obtain this superimposition it is also possible to provide that two beams come from two independent lasers, whose spectrum line width is a few kHz and which are then superimposed. The coherent detection of this bi-frequency beam by a photodiode provides a beat signal at the frequency resulting from the difference between the frequencies of the two beams. The frequency of the microwave signal thus produced can be adjusted simply by controlling the temperature of the one of the lasers (a variable temperature implies a variable frequency). Frequencies from a few GHz to a few tens of GHz can thus be obtained with the disadvantage however of a slow adjustment or change of this frequency (a few hundred ms to 1 s). Temperature stabilisation of the two lasers is necessary as it is possible to observe a frequency change of 3.1 GHz/°C. with a change of 1 GHz/s).

c)—Finally, the superimposition of two laser beams can use the non-linear phenomena of the Brillouin diffusion type stimulated in the optical fibres.

The Brillouin diffusion stimulated in the fibres is a threshold effect. (A few hundred $\mu W$ to a few tens of mW depending on the wavelength and the fibre used).

A tunable laser is coupled into a fibre as shown in FIG. 15. When this Brillouin threshold is exceeded, a modulation having a periodic index and of period $\lambda/2$ arises in that fibre. This modulation is due to an electrostriction phenomenon and it propagates at a velocity v which is determined by the nature of the material and in the same direction as the pump wave. The latter is reflected on this index modulation and supplies a contrapropagative wave translated in frequency to $w - 2\pi\, f$. The frequency f is determined by $f = 2.nv/\lambda$ where:

$\lambda$ is the pump wavelength, n is the index of the fibre, v is the velocity of the contra-propagative wave in the fibre.

The low losses obtained in the fibres (0.2 dB/km to a few dB/km) allow the use of long fibre lengths. The Brillouin diffusion effect being cumulative, it is thus possible to obtain typical coefficients of reflection of 40% (proportion of the pump reflected in the fibre while being translated). The fineness of this translation is in the order of few kHz to a few tens of kHz for lengths in the order of 1 km.

It is furthermore tunable by modification of $\lambda$. For example in silica where $v = 6\,000$ m/s, $\lambda = 0.8\ \mu m;\ f = 22$ GHz $\lambda = 1.06\ \mu m;\ f = 16.5$ GHz $\lambda = 1.5\ \mu m;\ f = 11.5$ GHz Thus a tunable laser, of the Ti Sapphire type (emitting between 0.6 and 1 $\mu m$ of wavelength) allows a tuning between approximately 30 GHz and 16 GHz. A fixed laser associated with an optical parametric oscillator (OPO), allowing the continuous examining of wavelengths from 1 to 4 $\mu m$, allows the scanning of frequencies f from 16 to 4 GHz.

The use of other fibres (fibres containing fluorine, Ge doped fibres, monocrystalline fibres) allows the covering of different frequency bands (change of v with respect to silica).

The reflected beam $(w - 2\lambda\, f)$ is finally superimposed on the incident beam (w). The coherent detection of this bi-frequency beam provides, as in the preceding patents, a beat signal and therefore the microwave frequency signal at f.

In the left hand section of FIG. 7 the first elements of the preceding system are found again. In the right hand section of the figure, the light beam constituted from NxN beams f1.1 to fN.N corresponding to the number of image elements of each plane of switches C1 to C3, is transmitted to a group of NxN detection diodes D1.1 to DN.N. These diodes detect the various beams f1.1 to fN.N which are phase-shifted with respect to each other according to the delays with which they have been allocated. They then control amplifiers for the transmission of microwave frequency signals by means of antenna elements E1.1 to EN.N.

The system of the invention can also be produced using switches in which it is a matter of switching each elementary beam according to its direction of polarisation.

For this purpose each switch is produced as shown in FIG. 8.

Such a switch comprises an input polarisation switch P1. This polariser comprises a set of switchable polarisers p1.1 to p1.n. According to a preferred embodiment, this switch is produced using a liquid crystal cell, each image element of such a cell allowing the rotation or non-rotation of the direction of polarisation of a portion of the input beam. Thus, two portions of beam f2 and f3 can have orthogonal polarisation directions. In order to be efficient, such a system must receive a linearly polarised beam F. Depending on the state of the liquid crystal cell, certain image elements will allow portions of light beams to be obtained without rotating the direction of polarisation. On the other hand, other image elements will rotate the direction of polarisation of the light.

The light coming from the polarisation switch P1 is transmitted to a polarisation separating cube CS. This polariser CS therefore transmits the portions of light beams having a specified direction of polarisation (polarisation indicated by an arrow in the figure) and reflects the orthogonal polarisation portions (polarisation indicated by a point in the figure).

For reasons of technical simplicity, it is advantageous to associate, with each separating cube, two polarisation switches P1 and P2, one switch being associated with one input face of the cube. The number of switching possibilities is thus multiplied by 2. This becomes even more advantageous as an exponential progression of possible delays is obtained depending on the number of switches.

FIG. 9a shows a practical embodiment of a separating cube and of an associated mirror. According to this embodiment a half-cube C1 is produced in the form of a prism having a parallelepipedic cross-section and has, opposite the face serving as a polarisation separator, a face which is rendered reflecting by a metallisation. Applied to FIG. 1, the structure of FIG. 9a corresponds to the switch C1. The switch C2 of FIG. 1 will therefore be produced as shown in FIG. 9b in the form of two identical prisms of parallelepipedic shape with reflecting faces M1.2 and M2.1, parallel to each other and parallel with the polarisation separating face C2.

Such embodiments allow the system to be made compact.

The invention can also be applied to the device described in the French Patent Application N° 89 15102. This patent application describes a device in which a certain number of optical delays are produced and then all the beams obtained from different delays are duplicated in $N^2$ directions. A spatial filtering device M1 then selects, in each direction, a beam representing a particular delay.

FIG. 10 shows the application of the invention to such a device.

The source S emits a light beam towards a device R designed as described previously and capable of inducing over p portions of beams a determined number q of possible delays. More precisely, a portion of the beam is allocated with a delay chosen from among q possible delays.

A holographic device H1 then allows the duplication of the p beam portions. This duplication is carried out in $N^2$ possible directions corresponding to the number of antenna elements to be controlled.

A spatial filter M1 selects a beam portion in each direction in order to control an antenna element (E1.1) by the intermediary of a diode (D1.1) and a microwave frequency amplifier (G1.1) and this is carried out using a single beam portion having a particular delay chosen from among the p delays provided at the output of the device R.

If the delays are encoded in geometric form, it is possible to have 2q delays of which only p will simultaneously be available for the a posteriori choice, that is to say which can be distributed to each scanning antenna element. It is noted that this device is a refinement of the device in the Patent Application FR 89 15102, as for the same attenuation of the initial power of the light wave it is possible to increase exponentially the number of potential delays. Furthermore, it is interesting to note that even if only p delays are simultaneously available, the potential of 2q delays with the same system allows a considerable enrichment of the number of radiation patterns of the antenna.

Finally let it be noted that a particularly advantageous method for producing optical switches in the case in which the basic delays are obtained by guided propagation of light (in a monomode fibre), consists in using integrated optical switches and in particular those with coupling by evanescent waves (COBRA).

The invention has therefore allowed an optical delay encoding to be achieved. The system of the invention allows the obtaining of a large number of delay with a device of low complexity and therefore of low cost and exhibiting a low attenuation of the light power.

By way of example, the embodiment of the invention using integrated optical devices can give rise to a configuration as shown in FIG. 11. Each optical switch (C1) produced in integrated optics comprises two inputs (e1.1, e1.2) and two outputs (s1.1 and s1.2) and allows the coupling of one input to one or other of the outputs according to its switching state.

The input e1.1 of the coupler C1 receives an optical input signal from the source S. The coupler transmits this signal either substantially directly to the input e2.1 of the switch C2, or to the input e2.2 of the switch C2 by the intermediary of a delay circuit t1. It can therefore be seen that the functioning of the device of FIG. 11 is similar to that of FIG. 1.

FIGS. 12 to 14 show a variant embodiment of the system for creating delays according to the invention. This variant is embodied using polarisation separators.

The creation of the first delay t1 is obtained using a spatial polariser P1 receiving a light beam from a source S, a polarisation separator SP11 transmitting the light of a specified polarisation to another polarisation separator SP12 and reflecting the light of another polarisation to a reflecting means R11. Another reflecting means R12 re-transmits the light coming from R11 to the separator SP12.

The length of the light path passing through the reflecting means determines the delay t1. The second delay t2 is determined by distancing the polarisation separators, and so on.

The polarisers such as P1 and P2 are spatial polarisers or spatial modulators of polarisation such that a beam has its polarisation spatially modulated. One way of producing these polarisers is to use liquid crystal cells in which each image element allows the rotation of the polarisation of a portion of beam.

The polarisation separators SP11, SP12, SP21, SP22 can be polarisation separator cubes. They are identically constituted that is to say they reflect the same type of polarisation and transmit another type of polarisation.

The reflecting means R11, R12, R21, R22 can be total reflection cubes.

Such an arrangement has the advantage of necessitating only a single spatial modulator per basic delay (t1, t2, ...) to be created.

FIG. 13 shows a compact embodiment of the system of FIG. 12.

The polarisation separators such as SP11 and SP12 are embodied in a single block and share a common central prism. The polariser P1 is placed beside the input face of the input prism. Finally, the reflecting means such as R11, R12, are embodied in the form of a single prism R1 similar to the common prism of the separator SP1.

The value of each delay is determined by the distance of the prism R1 from the separator SP1.

Thus, in FIG. 13, it can be seen that the distance of the prism R1 from the separator SP1 determines a certain delay t1 and that the distance of the prism R2 from the separator SP2 determines a longer delay t2.

By using this type of configuration it is therefore possible, as shown in FIG. 14, to determine a series of basic delays t1, t2, t4, ... tn which can for example be in a geometric progression.

It will be noted that such a system, in order to operate, will necessitate a centralised control of the polarisers (P1, P2 ...). In fact the control of each polariser (P2 for example) will depend on the polarity of each beam and therefore on the polarisation given to each beam by the polariser (P1 according to the example taken) which precedes it.

An advantage of this device operating in the transmission mode is the fact that, whatever the value of the delay chosen for a point of the antenna may be, the optical carrier has passed through the same number of dioptres which allows the obtaining of the same signal level on the photodiode whatever the chosen delay value may be.

According to a variant embodiment of the invention shown in FIG. 16, the separators (SP1, SP2) are connected to the prisms (R1, R2) by blocks of glass (BV1, BV2) of the same nature as the separators or the prisms.

Thus the propagation of the beams always takes place in an index medium. A reduction in the bulk of the system is thus obtained. Similarly, a gain in the angle of diffraction due to the pixels of the spatial modulators is obtained.

Furthermore, it is possible to cement all of the blocks to each other and to the spatial modulators as shown in FIG. 17.

It can be seen in FIG. 18 that the smallest delay value is $$\tau = \frac{2d}{c} n$$

where n is the refraction index of the prisms. This value is therefore limited by the size of the spatial light modulator and of the separator cubes. In the case of an antenna functioning purely in delays it is necessary to have 10 bits of delays between 0 and 16 $\lambda/c$ ($\lambda$ being the microwave frequency wavelength). In fact, 6 bits are necessary between 0 and $\lambda/c$ in order to minimise the amplitude of the secondary lobes. Four bits between $\lambda/c$ and 16 $\lambda/c$ are furthermore necessary for the deflection of the microwave frequency beam within $\pm 45°$ with a wide instantaneous frequency band. For an antenna operating at 3 GHz, $\lambda$ is approximately equal to 9 cm, the smallest delay increment is then $=\lambda/64c=2$ dn/c from which $d=\lambda/128$ n 500 $\mu$m. This value is not realistic for a spatial modulator which must comprise in the order of 32×32 pixels. For small values of delays the invention provides the arrangement shown in FIG. 19.

This system comprises:
a polarisation modulator P10, of the liquid crystal type for example;
a polarisation separator SP110 reflecting one polarisation and transmitting the other polarisation;
two reflecting devices M10 and M20 determining two optical paths for the two polarisations. These two paths have substantially the same geometric length but one of the paths includes a flat plate L1 with parallel faces:
a polarisation coupling device CP110 gathering the two polarisations into the same optical path.

In this system, the paths differ due to the plate with parallel faces L1, of thickness e and of index n. Therefore $=e.n/c$. For the first delays plates of thicknesses 500 $\mu$m, 1 mm, 2 mm ... will be chosen.

FIG. 20 shows another variant allowing short delays to be obtained.

Two doubly-refractive crystals CB10, CB11 are placed beside one another. The orientation of their main axis is chosen, as in the figure, to maximise the deflection undergone by one of the polarisations. The head-to-tail disposition of the two crystals ensures the coincidence in direction and exit point of the two orthogonal polarisations. In this case the optical path difference provides a delay $\tau = 2/c \; [(e^2+d^2)^{\frac{1}{2}} - e)]. \; n$ $\tau = 2n/c.e.[(1+tg^2\alpha)^{\frac{1}{2}} - 1]$ In calcite for example, $d=4$ mm for $e=36$ mm, that is to say tan $\alpha=1/9$. For $f=3$ GHz, e is therefore approximately equal to 80 mm for the smallest increment. For higher frequencies, $f=10$ to 100 GHz, it can be seen that very reasonable thicknesses of calcite are necessary (from 25 mm to 3 mm).

We claim:

1. Device for creating optical delays, comprising:
   several optical switches arranged in a determined order and each comprising at least a first input and a second input and at least a first output and a second output, for switching between optically coupling either
   (a) the first input to the first output and the second input to the second output or
   (b) the first input to the second output and the second input to the first output;
   a light source emitting a light beam wherein the first input of one of the several optical switches is connected to the light source;
   wherein the first output of each one of the several optical switches is connected to the first input of the following one of the several optical switches, except for a first output of a last one of the several optical switches which is connected to a user circuit;
   a plurality of optical delay circuits;
   wherein the second output of each one of the several optical switches is connected to the second input of the following one of the several optical switches by the intermediary of one of said plurality of optical delay circuits;
   wherein each one of said plurality of optical delay circuits comprises two similar doubly refractive crystals disposed head-to-tail; and
   wherein the plurality of optical delay circuits (t1, t2, t3) induce different delays whose delay values constitute a geometric progression.

2. Device according to claim 1, wherein the plurality of optical delay circuits each comprise a plate with parallel faces.

3. Device according to claim 1, wherein each of the plurality of optical delay circuits comprises two similar doubly-refractive crystals disposed head-to-tail.

4. Device for creating optical delays, comprising:

several circuits for creating elementary optical delays placed in series, each of said several circuits comprising:
- a polarization modulator receiving a light beam from a source and re-transmitting a beam modulated in polarizations;
- a first polarization separator receiving the beam modulated in polarizations, transmitting the light of a first polarization and reflecting the light of a second polarization;
- reflection means receiving the light reflected by the first polarization separator and reflecting it;
- a second polarization separator receiving on the one hand the light from the first polarization and re-transmitting it to a following one of the several circuits for creating elementary optical delays and on the other hand the light from the second polarization transmitted by the reflecting means and reflecting this light to the following one of the several circuits for creating elementary optical delays; and
- wherein the elementary optical delays provided by at least two of the several circuits for creating elementary optical delays are different from one another.

5. Device for creating optical delays according to claim 4, characterized in that the polarization separators comprise polarization separating cubes.

6. Device for creating optical delays according to claim 5, wherein:
the polarization separators (SP11, SP12) of one of the several circuits for creating elementary optical delays form a single block and share a common prism, the reflecting means (R11, R12) comprising a total reflection prism similar to the common prism of the polarization separators.

7. Device for the optical control of a scanning antenna according to one of claims 1 or 4, comprising:
- an array of a determined number ($N^2$) of antenna elements (E1, ... $EN^2$), the various elements being arranged according to a determined order and each controlled by a microwave frequency amplifier (G1, ... $GN^2$);
- a light source (S) simultaneously emitting at least two collinear beams having different frequencies and comprising;
- $N^2$ delay devices comprising a number (P) of switchable optical paths receiving the two collinear beams and each of said $N^2$ delay devices providing an optical propagation time, and
- $N^2$ photodetector devices each coupled to a microwave frequency amplifier (G1, ... $GN^2$) in order to control an antenna element (E1, ... EN).

8. Device according to claim 7, wherein each of said $N^2$ delay devices comprise a
(a) basic optical path and, connected in parallel with different portions of this basic optical path,
(b) switchable secondary optical paths having different lengths.

9. Device according to claim 8, wherein the secondary optical paths are connected to the basic optical path by means of optical switches.

10. Device according to claim 8, wherein the various secondary optical paths are connected in parallel with successive zones of the basic optical path.

11. Device according to claim 8, wherein the various delays produced by the various optical paths vary according to a geometric progression.

12. Device according to claim 11, wherein the ratio of the geometric progression has the value 2.

13. Device according to claim 10, wherein the optical switches are grouped in switching assemblies, each assembly being allocated to a direction.

14. Device according to claim 13, characterized in that each switching assembly comprises a cell of switching elements, each switching element being capable of assuming either a "passing" state or "reflecting" state wherein the light arriving at a "passing" switching element being re-transmitted substantially without being deflected, the light arriving on a "reflecting" switching element being reflected.

15. Device according to claim 14, characterized in that said cell of switching elements is a liquid crystal cell.

16. Device according to claim 15, characterized in that said cell of switching elements comprises a polarizer located at the input.

17. Device according to claim 14, characterized in that each cell of switching elements is between two prisms.

18. Device according to claim 14, further comprising beam divider means for adapting the cross-section of the light beams supplied by the source (SL) to the switching area of the switching cells.

19. Device according to claim 7, further comprising:
- a duplication device (H1) allowing the duplication of the beams coming from each delay device according to a specified number of duplicated directions,
- a spatial filtering device (M1) comprising as many filters as there are duplicated directions and delay devices, and
- wherein said duplication device and said beam divider are located between said $N^2$ delay devices and said $N^2$ photodetector devices.

20. Device for creating optical delays, comprising:
several optical circuits for creating elementary optical delays, placed in series, each of said several optical circuits comprising:
- a polarization modulator for receiving a light beam from a source S and re-transmitting a beam modulated in polarizations;
- a polarization separator for receiving the modulated beam, transmitting the light of a first polarization, and reflecting the light of a second polarization;
- a first optical path and a second optical path respectively transmitting the light of the first polarization and the light of the second polarization, one of the two optical paths comprising a plate with parallel faces;
- a circuit for recombining the light of the two polarizations and
- wherein the elementary optical delays created by the optical delay creating circuits are all different from one another.

21. Device for creating optical delays, comprising:
several optical circuits for creating elementary delays placed in series, each of said several optical circuits comprising:
- a polarization modulator for receiving a light beam from a source S and re-transmitting a beam modulated in polarizations;
- a first doubly-refractive crystal placed in series with the modulator in order to not deflect a first polarization and to deflect a second polarization;

a second doubly-refractive crystal having a constitution similar to the first doubly-refractive crystal, placed head-to-tail with the latter, in order to not deflect the first polarization and to deflect the second polarization.

22. A device for providing any one of several optical delays to an optical signal, comprising:
- a light source for producing a light beam propagating along a first direction and a means for modulating the light beam with a signal, the means for modulating being coupled to the light source, thereby providing the optical signal;
- a plurality of switchable optical delay means, each one of the plurality of switchable optical delay means having an input for receiving an optical signal and an output for transmitting the optical signal, the output of said each one of the plurality of switchable optical delays means being coupled to an input of a next one of the plurality of switchable optical delay means,
- each one of the switchable optical delay means for providing an optical signal received at its input to the input of said next one of the plurality of optical delay means after a first delay or a second delay, a difference between the first delay and the second delay provided by each one of the switchable optical delay means defining a relative delay provided by said each one of the switchable optical delays;
- wherein the relative delays provided by two of the plurality of switchable optical delay means are different from one another,
- wherein one of the plurality of switchable optical delay means comprising two doubly refractive crystals positioned adjacent one another such that a first optical beam having a first polarization that passes through the two crystals obtains a relative phase delay as compared with a second optical beam passing through the crystals that is collinear with the first optical beam and which has a second polarization perpendicular to the first polarization.

23. A device for providing any one of several optical delays to an optical signal, comprising:
- a light source for producing a light beam propagating along a first direction and a means for modulating the light beam with a signal, the means for modulating being coupled to the light source, thereby providing the optical signal;
- a plurality of switchable optical delay means, each one of the plurality of switchable optical delay means having an input for receiving an optical signal and an output for transmitting the optical signal, the output of said each one of the plurality of switchable optical delays means being coupled to an input of a next one of the plurality of switchable optical delay means,
- each one of the switchable optical delay means for providing an optical signal received at its input to the input of said next one of the plurality of optical delay means after a first delay or a second delay, a difference between the first delay and the second delay provided by each one of the switchable optical delay means defining a relative delay provided by said each one of the switchable optical delays;
- wherein the relative delays provided by two of the plurality of switchable optical delay means are different from one another,
- wherein one of the plurality of switchable optical delay means comprising a polarizing beam splitter which has an interface providing polarization and a means for rotating polarization of light.

24. A device according to claim 23 wherein the polarizing beam splitter comprising a mirrored surface that is parallel with said interface.

25. A device according to claim 22 or 23, wherein the relative delays provided by each of the plurality of optical delay means are different from one another.

26. A device according to claim 22 or 23, wherein the relative delays provided by each of the plurality of optical delay means follow a geometric progression.

27. A device for providing any one of several optical delays to an optical signal, comprising:
- a light source for producing a light beam propagating along a first direction and a means for modulating the light beam with a signal, the means for modulating being coupled to the light source, thereby providing the optical signal;
- a plurality of planar arrays of switchable optical delay means, each one of the plurality of switchable optical delay means of each one of the plurality of arrays having an input for receiving an optical signal and an output for transmitting the optical signal, the output of said each switchable optical delay means of one of the arrays being coupled to an input of each switchable optical delay means of a next one of the arrays,
- each one of the switchable optical delay means for providing an optical signal received at its input to the input of said next one of the plurality of optical delay means after a first delay or a second delay, a difference between the first delay and the second delay provided by each one of the switchable optical delay means defining a relative delay provided by said each one of the switchable optical delays;
- wherein the relative delays provided by two of the plurality of the switchable optical delay means are different from one another.

28. A device according to any one of claim 22, 23, and 27, wherein the switchable optical delay means further comprises means for reflecting light comprising a corner cube.

29. A device according to claim 27, wherein the relative delays provided by all elements of each of the arrays of switchable optical delay means are the same and the delays associated with each of the arrays are different from one another.

30. A device according to claim 29, wherein the relative delays provided by each of the arrays follow a geometric progression.

31. A device according to claim 27 further comprising a spatial filtering device disposed opposing one of the arrays and along the first direction.

* * * * *